United States Patent [19]

Rojas

[11] Patent Number: 5,415,250
[45] Date of Patent: May 16, 1995

[54] FOOD CONVEYOR FOR AIRCRAFT PASSENGERS

[76] Inventor: Libardo Rojas, 50 Lake Ave., Blasdell, N.Y. 14219

[21] Appl. No.: 14

[22] Filed: Jan. 4, 1993

[51] Int. Cl.$^6$ ................. B64D 11/00; B65G 17/20
[52] U.S. Cl. .................................. 186/40; 244/118.5
[58] Field of Search ..................... 186/40, 49, 50; 244/118.1, 118.5

[56] References Cited

U.S. PATENT DOCUMENTS

| | | | |
|---|---|---|---|
| 3,102,607 | 9/1963 | Roberts | 186/40 |
| 3,396,820 | 8/1968 | Kenny | 186/40 |
| 3,615,003 | 10/1971 | Rust | 186/40 |
| 3,999,630 | 12/1976 | McPhee | 244/118.5 X |

Primary Examiner—F. J. Bartuska

[57] ABSTRACT

The food conveyor will be used on passenger planes with the capacity to hold over 30 people and will consist on a continuous conveyor-carrousel localized in the passenger compartment of the plane on each side of the aisle and suspended from the ceiling. It is controlled by one of the attendants from the kitchen area where the motor is located which makes the conveyor to circulate in order to carry and to deliver the feeding and empty trays, beverages, etc. around to the passengers thus making the attendant's work easier and also, allowing the aisle of the plane to be kept free, at all times, of any obstacle for the free movement of the passengers and the attendants.

4 Claims, 6 Drawing Sheets

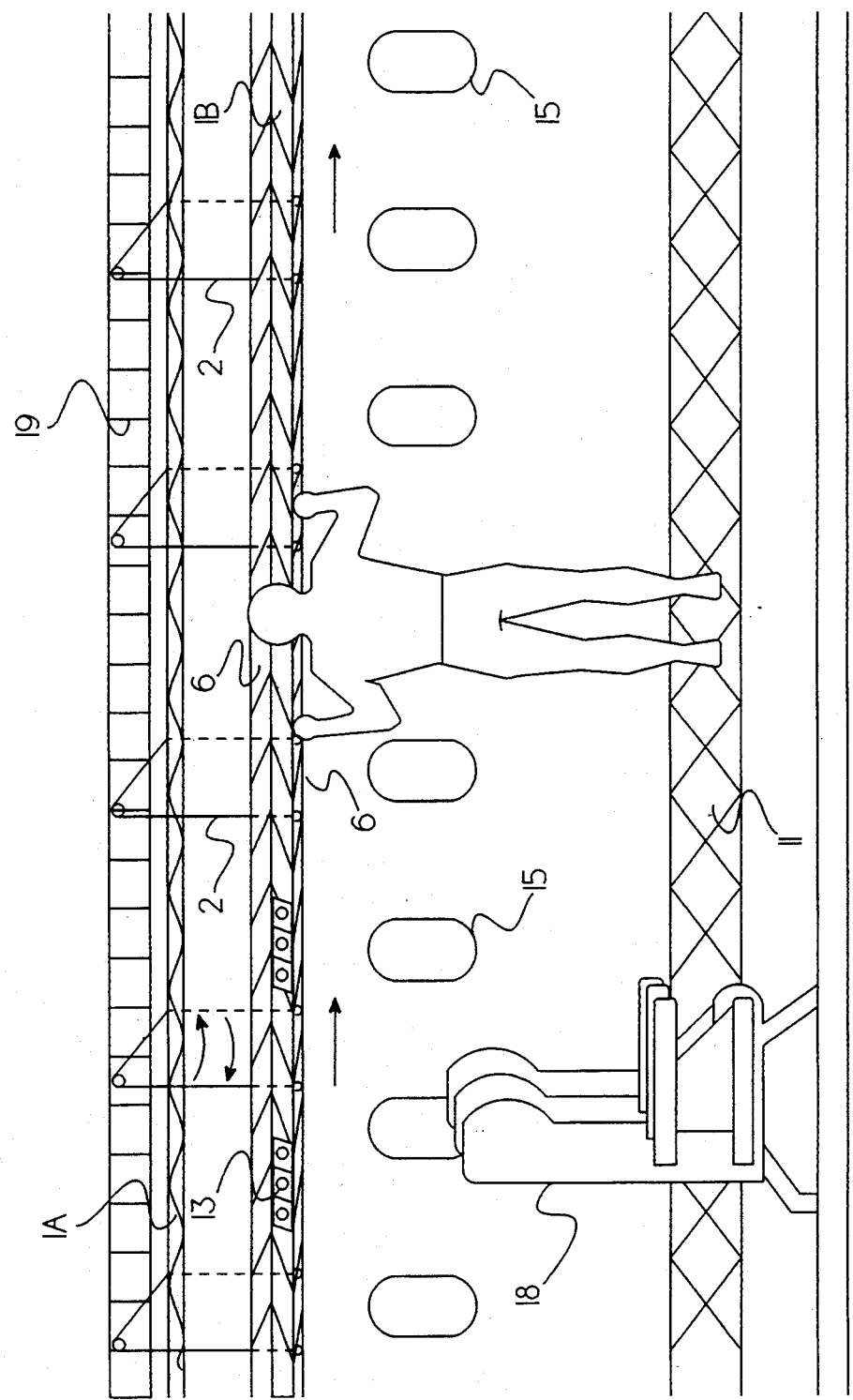

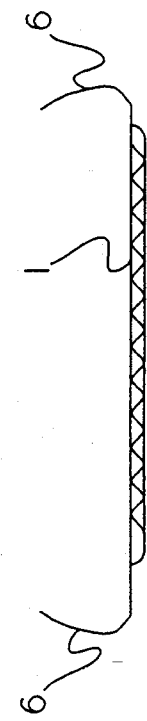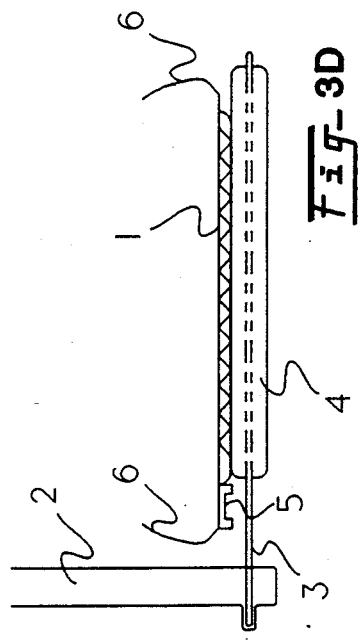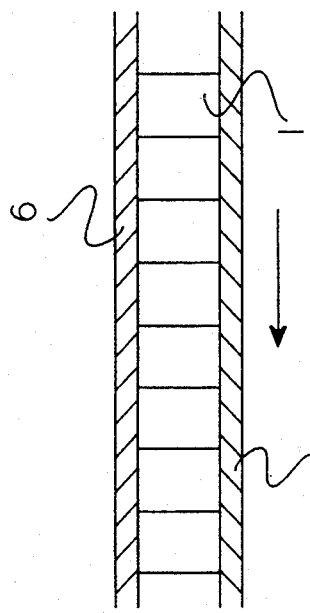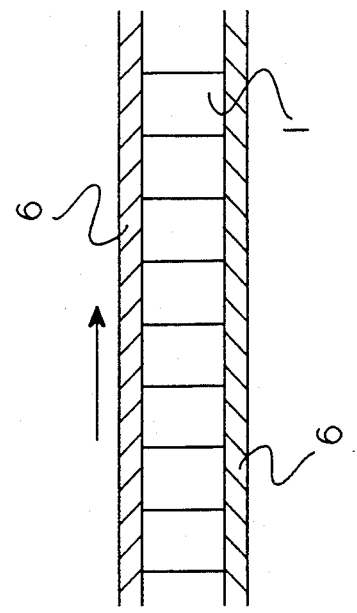

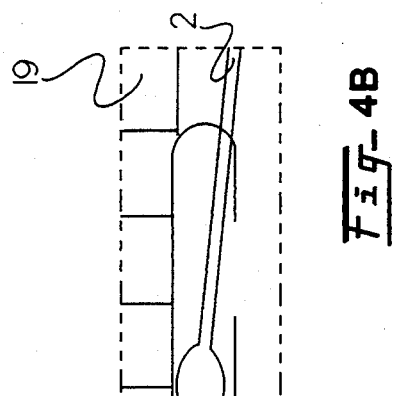
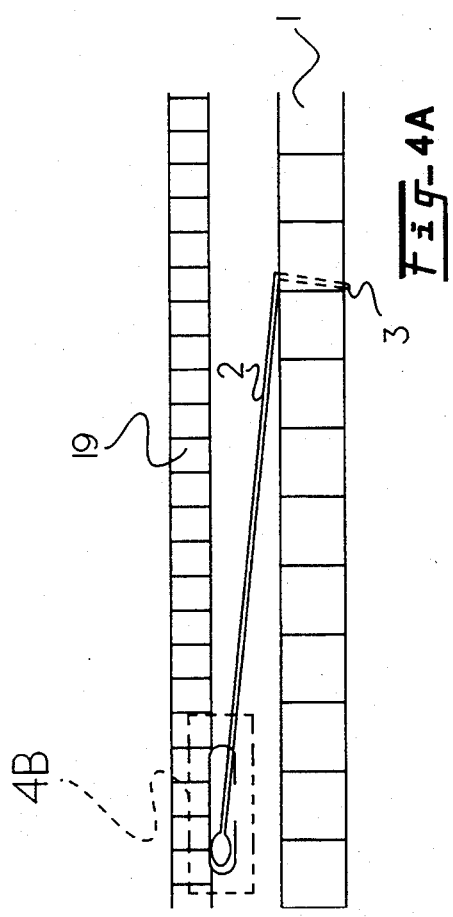
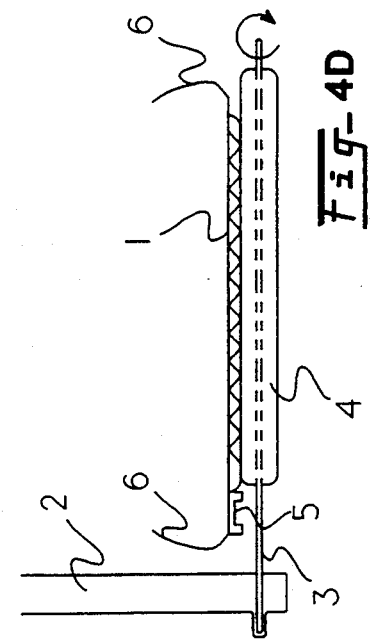
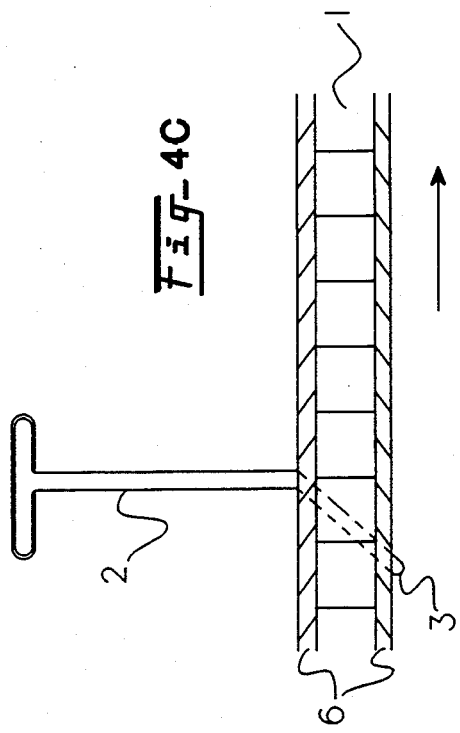

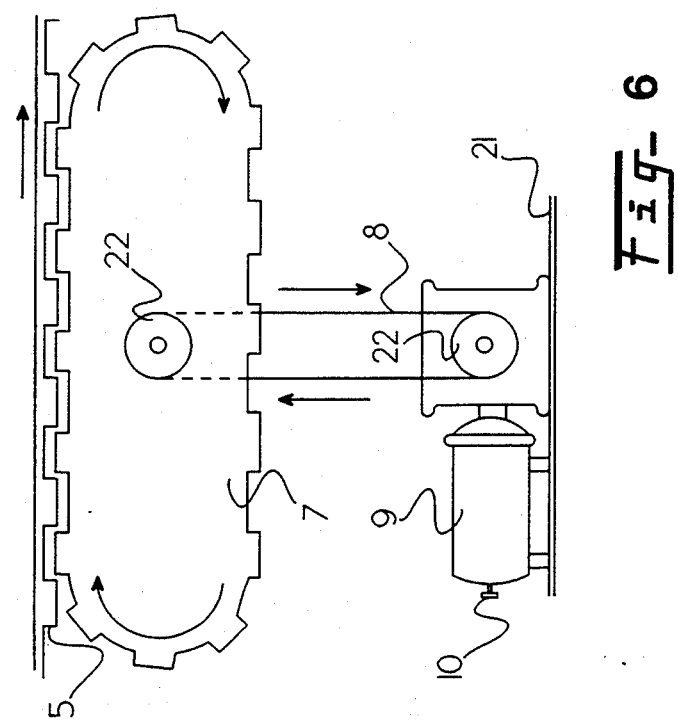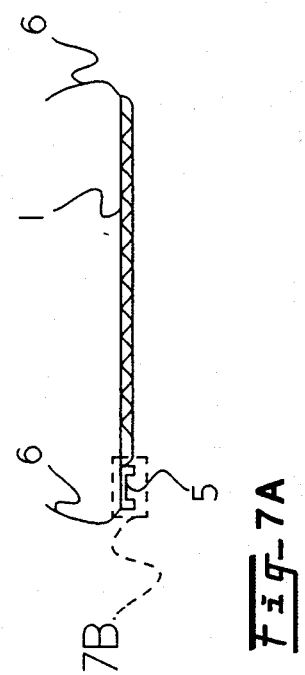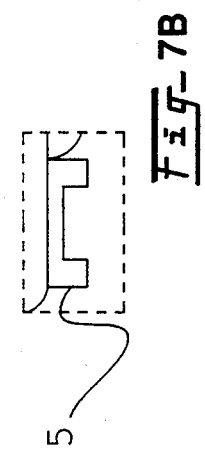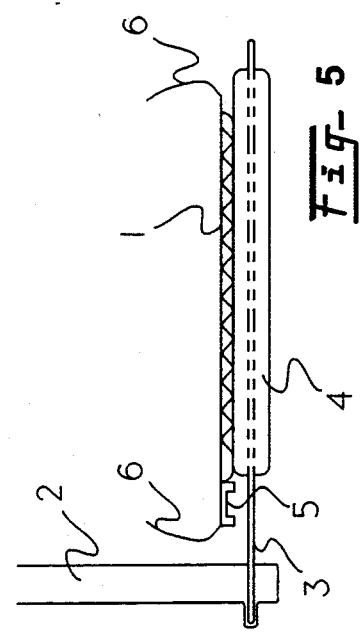

FOOD CONVEYOR FOR AIRCRAFT PASSENGERS

BACKGROUND OF THE INVENTION

After flying many thousands of miles with different airline companies, I have seen the attendants struggle to deliver drinks and/or meals on time to the passengers and this is mostly due to the very narrow aisle which barely allows enough room for the food cart used to distribute the drinks and the trays. This makes it almost impossible for a passenger to pass around the food cart and, of course, creates a very uncomfortable situation for a passenger who, as in an emergency, may require the use of the W. C. of the plane. This delivery of food and beverages takes up a long period of flying time because first, they serve drinks which is followed by the trays with the meals. Then, more drinks are served and followed by the disposal of the empty trays and drinks. To provide this type of service, it usually requires 2-3 attendants, plus the one who is stationed in the kitchen area to organize the trays and drinks and then later on, to dispose of them, thus keeping the attendants occupied with that job during a major part of the flying time and making it difficult for them to take care of an emergency that may occur.

Based on this inconvenience and many many others which I will not enumerate at the present time, I have designed an invention which I will call the, "Use of a Food conveyor for aircraft passengers". This will deliver the precious services as mentioned above by using less attendants and by keeping the aisle clear at all times to allow for walking without any hazards nor inconveniences. This food conveyor can be installed in almost any commercial aircraft in service at the present time in the world which carries over 40-50 passengers.

THE PRIOR ART

I am aware of the following U.S. Patents directed in one way or another to the different conveyors used.

Roberts. U.S. Pat. No. 3,102,607. Issued Sep. 3, 1963 for the "Carrier System for Transport and Delivery Alonf a Trackway".

Kenny. U.S. Pat. No. 3,396,820. Issued Aug. 13, 1968 for the "Food Conveying Apparatus for Aircraft".

Rust. U.S. Pat. No. 3,615,003. Issued Oct. 26, 1971 for the "Food Conveyor System for A Vehicle".

Anderson. U.S. Pat. No. 3,666,092. Issued May 30, 1972 for the "Sizer Conveyor".

Holmquist. U.S. Pat. No. 3,952,861. Issued Aug. 27, 1976 for the "Conveyor Belt Support Assembly".

McPhee. U.S. Pat. No. 3,999,630. Issued Dec. 28, 1976 for the "Transport and Service Device".

OBJECTS OF THE INVENTION

I have designed this "Food Conveyor for Aircraft Passengers" as a primary object to be installed in almost any commercial aircraft in service at the present time in the world which will be able to carry over 40-50 passengers. Besides making the work of the attendants much easier and quicker, this invention will help keep the aisle of the airplane clear at all times to allow for the free movement of the passengers and the attendants.

I have designed this "Food Conveyor for Aircraft Passengers" as a continuous conveyor-carrousel suspended from the ceiling in the passenger compartment of the airplane and with the motor control to be located in the kitchen area. This motor gives the power and causes the conveyor to move in a circular motion through out the airplane cabin. This conveyor-carrousel could be raised or lowered by a hydraulic power similar to that used for raising and lowering the airplane tires. The conveyor itself will be covered by a plastic lamina with an upward bent position on each side thus allowing the passengers to be protected in case of any spillage from the drinks and, this conveyor-carrousel will be lowered to eye level to allow for the attendants to reach up for the removal of the trays and/or drinks in a safe way.

BRIEF DESCRIPTION OF THE DRAWINGS

FIG. 2 is a vertical sectional view through a cabin of an aircraft showing the 2 different positions of the delivery conveyor location (the 'up' or 'rest' position) and (the 'down' or 'working' position).

FIGS. 3, 3A, 3B and 3C show the plastic transparent lamina attached to the conveyor sides.

FIG. 4 shows a saggital view of the conveyor support in the 'resting' (no motion) position.

FIG. 4A is a partial vertical sectional view along the line A—A of FIG. 4.

FIG. 4B & 4C each is a fragmentary vertical sectional view of the carriage 'in motion' and the trackway support.

FIG. 5 is the same as FIG. 4C but, it is enlarged giving more details.

FIG. 6 is a vertical sectional view of the motor that produces the conveyor-carrousel motion.

FIG. 7 is a transverse sectional view of the conveyor with the continuous attached steel-toothed chain that produces the conveyor motion.

FIG. 7A is an enlarged detailed view of the steel-toothed chain taken along the line b—b of FIG. 7.

DESCRIPTION OF THE PREFERRED EMBODIMENTS

Figure 1:
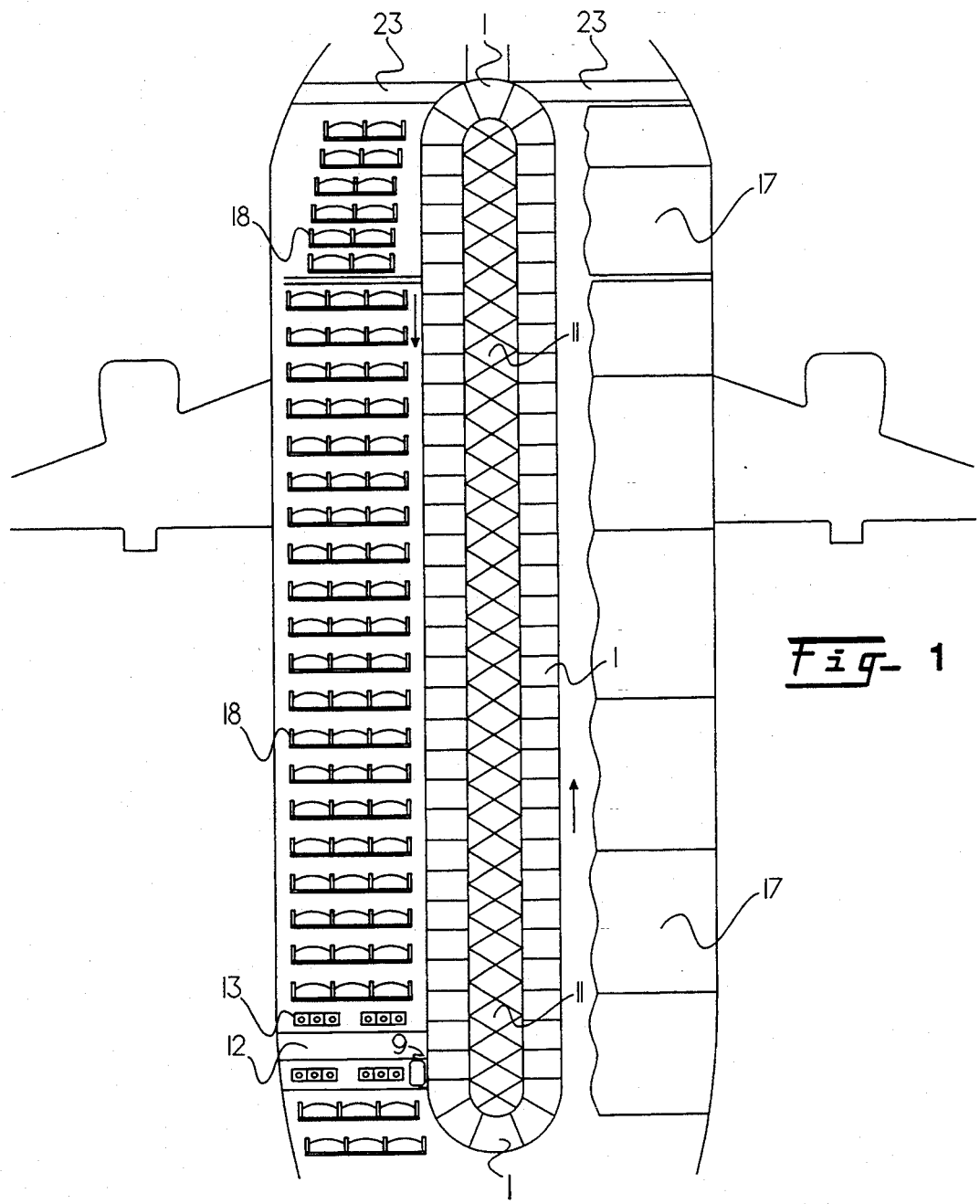
FIG. 1 is a longitudinal sectional view through a cabin of an aircraft showing the delivery conveyor location.

Referring to the figures of the drawings in the detail and, in using a B737-400 aircraft as a model for this description; FIG. 1 shows a longitudinal sectional view through the fuselage of an aircraft depicting the passenger seats 18 on the left side of the cabin and, the standard overhead carrying racks 17 on the right side. In the center is the main aisle 11. On each side of the aisle 11 and hanging from the ceiling 19 by main support rods 2, FIG. 2, shows a continuous conveyor-carrousel 1 which is 12 inches wide in order to be able to hold any tray available. Conveyor-carrousel 1 is going from the rear of the aircraft to the front of it, in some aircraft it can be from the rear of the aircraft to the front lavatories 23 and, is controlled from the kitchen area 12 by two electric switches 9. Switch #1 will lower and raise the main support rods 2, FIGS. 2, 3, and 4, from where the conveyor-carrousel 1 is in the resting position. This action will be done by using hydraulic power similar to that produced when lowering and raising the airplane tires. Switch #2, which is 10 on FIG. 6, will start and stop the conveyor motion. This one will move in only one direction, forward; even so, it can be adapted to the backward motion if necessary. The lowest that the conveyor-carrousel 1 ca go will be at the time of serving the trays and beverages and, the distance will be around 15 inches from the ceiling 19 to allow any attendant to pick up a tray from the conveyor which will be at eye level of a "normal" individual's height and, the distance will be very well above the passengers occupying the aisle seats 18 on the right and the left sides. When the conveyor-carrousel 1 is not in use, it will be lifted up by switch #1 and will be kept in the 'resting' position around 3 inches below the ceiling 19, FIGS. 2 and 4. The attendant that will be in charge of the delivery of the trays and beverages to the passengers will walk completely free in the central aisle 11, FIG. 2, and will be able to take each one of the trays from the moving carrousel and deliver it to the passengers without any obstacles being in the aisle 11. The passengers also will be able to walk in the aisle 11 at any time without problems. The conveyor-carrousel 1 will be controlled by another attendant in the kitchen area 12, FIG. 8, who will be in charge of raising and/or lowering the conveyor-carrousel 1 and putting it into motion by using the switch 10 which activates a positive-negative current through an electric motor 9. The main switch 10 will deliver 3 different speeds:

a) very slow motion allowing for the delivery of beverages in an open glass, b) slow motion allowing for the delivery of the trays 13 and closed beverages and, c) moderate speed allowing for the return of the disposals (empty trays, cups, etc.)

In this way, this type of work can be done by only 2 attendants. In order to deliver hot beverages (coffee, tea) in rough weather, the empty cups will be delivered through the conveyor-carrousel 1 and the 'delivery' attendant will carry a 'hot' pitcher to serve the individual passengers. The 'supply' attendant in the kitchen 12, FIG. 8, will be loading the trays 13 individually on to the conveyor-carrousel. To provide the necessary things required for extra protection to the passengers from spillage from the conveyor-carrousel 1, it will have, on each side and attached to it, a transport fibre glass shield 6, FIGS. 3, 3a, 3b, 3c, 4c, 5, and 7, turning upward and slightly inside approx. 4 inches wide.

Figure 8:
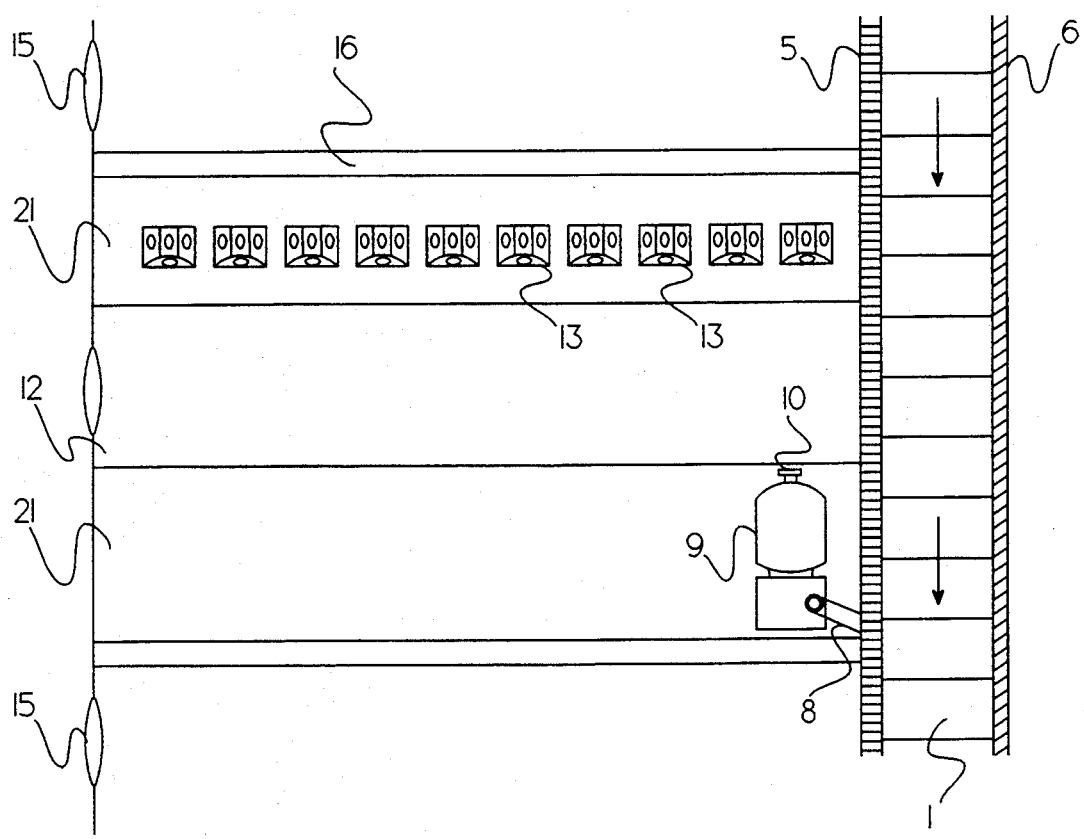
FIG. 8 is a transverse sectional view of the kitchen area showing the pulley motor location in relationship with the mobile chain conveyor.

The attendant in the kitchen area 12, FIG. 8, will also be in charge of starting and stopping the conveyor-carrousel 1. This can be put in motion by using the main motor 9 which will be located at the kitchen counter 21 right below the conveyor-carrousel 1 and, by flipping the start switch 10 on any of the 3 different speeds enumerated before, FIG. 6, it will create a motion of the drive belt 22 and with that, a pulley 8 will generate a movement of a steel-tooted chain 5, FIGS. 3c, 4c, 5, 6, 7, and 7a, on the conveyor-carrousel 1 which will be present all along the length of the track of the conveyor-carrousel 1. It is attached on the inner area, FIG. 8, and occupies 4 inches width in space, FIG. 7a; 2 inches for the engaged track and 1 inch at each side of the track. With the coupling of these two steel-toothed chains, one at the motor 9 area and the other one all the way along the length of the conveyor-carrousel 1, FIGS. 6, and 8, will produce the motion of the conveyor-carrousel 1 to facilitate the delivery of the food and beverages on the aircraft.

The conveyor-carrousel 1 will be supported by steady main rods 2, FIGS. 2, 3c, 4, 4a, 4b, 4c, and 5, which are suspended from the aircraft ceiling 19 and are positioned every 5 feet apart. They are alternated on the right and left sides of the conveyor-carrousel 1 in order to provide a better support, FIG. 2. These main rods 2 will have a free motion at the ceiling 19 and are from 1 to 2 feet long, depending upon the distance between the ceiling 19 and the aisle 11 of the aircraft, FIG. 2, thus permitting the attendants to reach the conveyor-carrousel 1 without too much effort and allowing him/her to deliver the trays and beverages to the passengers. Where the conveyor crosses over and above the aisle, at the front and rear of the aircraft, a 'PRECAUTION' sign will be present in that area to advise the passengers of the height of the conveyor.

The main support rods 2 will be located, in the 'resting' position, at 3 inches from the aircraft ceiling 19 but, when the conveyor-carrousel 1 will be in use, the main support rods 2, from the semi-horizontal position, FIG. 4, will turn to a complete vertical position, FIGS. 4b, 4c, and 5, in order to hold the conveyor-carrousel 1.

At the lower corner of the main support rods 2, FIGS. 3c, 4b, 4c, and 5, there will be an open space of 0.6 of an inch to allow a round, solid steel rod 3 with the size of 0.5 of an inch in diameter by 13 inches in length to pass through and, over this steel rod 3, the conveyor-carrousel 1 will rest. This steel rod 3, FIG. 5, will have the capability to rotate 360 degrees in order to facilitate the gliding motion of the conveyor-carrousel 1. In order to provide for a smooth and soundless motion, the steel rod 3, FIG. 5, will be surrounded by a rubber padding 4 at the distal 7 inches of the steel rod 3. This rubber padding 4 will be in contact with the underside of the conveyor-carrousel 1 and, in this way, making the motion to be soft and smooth.

After the final use of the conveyor-carrousel 1 is accomplished and, with the push of switch #1, it will reverse the action of the conveyor-carrousel 1 which will raise it up and therefore the main support rods 2 will return to the 'resting' position as in the beginning of this procedure; ready to be used for the next delivery of food and beverages to the passengers.

I claim:

1. A system for transporting items on board an aircraft comprising; a continuous conveyor carrousel driven by an electric motor, the carrousel is suspended and supported in the aircraft by retractable rods, which rods are mounted for movement from a resting position holding the carrousel in an elevated, space saving position to a vertical position suspending the carrousel in a lower position in which items can be transported on the conveyor from a loading area of the aircraft to a delivery area of the aircraft.

2. The system for transporting items of claim 1 wherein the electric motor has three speeds to regulate the velocity of the conveyor.

3. The system for transporting items of claim 1 including a steel-toothed chain and a pulley for coupling the electric motor to the conveyor.

4. The system for transporting items of claim 1 including a transparent fiberglass shield attached to the sides of the carrousel to catch any spillage from the items.

* * * * *